United States Patent [19]

Goncharov et al.

[11] 4,287,779

[45] Sep. 8, 1981

[54] DIRECTIONAL-ACTION MECHANICAL VIBRATOR AND A MECHANICAL SYSTEM FOR CONVERTING ROTARY MOTION INTO RECIPROCATING MOTION

[76] Inventors: Evgeny S. Goncharov, ulitsa Lomonosova, 30/1, kv. 46; Anatoly N. Prilutsky, ulitsa Entuziastov, 29/2, kv. 36, both of Kiev; Viktor I. Shevchuk, Vasilkovskogo raiona ulitsa Vokzalnaya, 23, kv. 33, poselok Glevakha Kievskoi oblasti, all of U.S.S.R.

[21] Appl. No.: 56,702

[22] Filed: Jul. 11, 1979

[51] Int. Cl.[3] ......................... B07B 1/42; F16H 21/16

[52] U.S. Cl. ................................... 74/26; 209/365 R

[58] Field of Search ...................... 74/26, 44; 198/766; 209/367, 365 R, 365 A, 365 B, 365 C

[56] References Cited

U.S. PATENT DOCUMENTS

| | | | |
|---|---|---|---|
| 1,986,102 | 1/1935 | Cole | 209/365 A |
| 1,993,615 | 3/1935 | Murry | 209/365 B |
| 2,214,921 | 9/1940 | Criswell | 74/604 |
| 2,901,111 | 8/1959 | Eppenberger | 198/766 |
| 2,968,424 | 1/1961 | Lawson | 198/766 |
| 3,024,663 | 3/1962 | Carrier et al. | 198/766 |
| 3,055,338 | 9/1962 | Herzhoff et al. | 209/365 R |

FOREIGN PATENT DOCUMENTS

| | | | |
|---|---|---|---|
| 855353 | 11/1952 | Fed. Rep. of Germany | 209/365 B |
| 435854 | 7/1934 | United Kingdom | 209/365 A |
| 601046 | 4/1948 | United Kingdom | 209/365 R |

*Primary Examiner*—Lawrence J. Staab

*Attorney, Agent, or Firm*—Lackenbach, Lilling & Siegel

[57] ABSTRACT

The directional-action mechanical vibrator comprises a housing which accommodates a shaft carrying a number of inertia masses arranged eccentrically thereon, said shaft being linked to a power drive, and a rod is adapted to impart motion to the mass being vibrated which is mounted on a support. The shaft has a crank, and the rod is articulated, through one of its ends, to the crank, and through the other end, to the mass being vibrated, whereas the housing is linked to the support of the mass being vibrated through the hinge joint, and the axis of the shaft is parallel to the axis of the hinge joint.

The mechanical system for converting rotary motion into reciprocating motion incorporates said mechanical vibrator and a power drive kinematically associated with said vibrator and comprising an electric motor with a pulley set on the motor shaft, and another pulley is set on the vibrator shaft. The drive pulley is offset with respect to the axis of said shaft in a direction diametrally opposite to the crank a distance approximately equal to the oscillation amplitude of the axis of the vibrator shaft which provides for stabilization of the oscillation amplitude of the mass being vibrated and adds to the operating reliability of the power drive of the machines that make use of the said mechanical system.

2 Claims, 2 Drawing Figures

DIRECTIONAL-ACTION MECHANICAL VIBRATOR AND A MECHANICAL SYSTEM FOR CONVERTING ROTARY MOTION INTO RECIPROCATING MOTION

The present invention relates to mechanical vibrators and has particular reference to directional-action mechanical vibrators.

This invention can find a very wide variety of applications in loose materials separating machinery, jigging conveyers, vibrocompactors, etc. all of which are made use of in diverse industries.

BACKGROUND OF THE INVENTION

Directional-action mechanical vibrators are known in the art, such as crank-type ones. These vibrators comprise a crankshaft carrying a number of inertia masses arranged eccentrically thereon, said crankshaft being accommodated in a housing and linked to a drive. A rod is coupled with one of its ends to the crankshaft and with the other end, to the mass being vibrated, whereas the vibrator housing is fixed in place on the frame of the mass being vibrated. Such vibrators impart fixed-amplitude directional oscillating motion to the mass being vibrated but, however, fail to adequately balance the forces of inertia developed by said mass.

Application in such vibrators of additional shafts carrying inertia masses eccentrically arranged thereon and linked to the crankshaft through gearings, makes it possible to provide for a better balancing of the forces of inertia. However, this complicates the construction of the vibrators very much.

Some other directional-action mechanical vibrators are also known (cf., e.g., Swedish Pat. No. 921,231). Such a vibrator is of the single-shaft inertia-type mechanism and comprises a shaft carrying a number of inertia masses arranged eccentrically thereon, said shaft being accommodated in a housing, and a rod that imparts motion to the mass being vibrated is locked-in with the housing. When the shaft of the abovesaid vibrator rotates, inertia masses arranged eccentrically thereon develop a force of inertia which imparts a directional reciprocating motion to the mass being vibrated and a pendulum motion to the vibrator housing in a direction normal to that of the reciprocating mass. Thus, almost complete balancing of the inertia forces is attained. Such a directional-action vibrator is simpler in construction than multiple-shaft crank-type directional-action vibrators. However, inasmuch as the amount of amplitude of the mass being vibrated depends upon the magnitude of said mass, it varies with a change of the latter. This phenomenon occurs when the known vibrator is employed in diverse separating machinery, jigging conveyers, etc. under variable rate of charging with a loose material. This results, in the case of separating machines, in affected operating quality thereof, as optimum kinematic conditions of the separating process are impaired. Apart from this disadvantage the known vibrator also suffers from another disadvantage which, due to the vibrator housing being held to the mass being vibrated, it performs reciprocating motion along therewith, involves extra loads upon the bearing structures of the mass being vibrated and adds to power consumption.

Known in the present state of the art are some mechanical systems for converting rotary motion into reciprocating motion (cf., e.g., Accepted Application of the Federal Republic of Germany, No. 1,558,844). Such a system comprises a single-shaft inertia-type vibrator whose housing is made fast directly on the spring-opposed mass being vibrated. The vibrator shaft is accommodated in the housing and rests upon two supports, while an inertia mass is arranged eccentrically on said shaft between the supports thereof, and additional inertia masses are movably and eccentrically mounted on the shaft beyond the supports thereof. One of the shaft ends mounts a pulley whose axis aligns with that of the shaft, said pulley being linked, through a V-belt, to another pulley set on the electric motor shaft. The axis of the motor shaft and that of the vibrator shaft are coplanar, their plane being normal to the direction of reciprocating motion performed by the mass being vibrated. When the vibrator shaft rotates the inertia masses arranged eccentrically thereon develop such forces of inertia that the resultant thereof compels reciprocating motion of the spring-opposed mass being vibrated. It is in this way that rotary motion is converted into reciprocating motion in said known mechanical system.

SUMMARY OF THE INVENTION

It is therefore a primary and essential object of the present invention to provide such a directional-action mechanical vibrator that would stabilize the oscillating conditions of a variable-magnitude mass being vibrated.

It is another object of the present invention to attain a higher reliability of a mechanical system for converting rotary motion into reciprocating motion.

It is still another object of the present invention to simplify the construction of a mechanical system for converting rotary motion into reciprocating motion.

It is yet another object of the present invention to increase the operational reliability of the vibrator drive.

It is a further object of the present invention to reduce dynamic behavior and increase operational efficiency of the machines that make use of the mechanical vibrator.

These and other objects of the invention are accomplished by that in a directional-action mechanical vibrator comprising a housing accommodating a shaft which carries a number of inertia masses arranged eccentrically thereon and which is linked to a power drive, and a rod is adapted to impart motion to the mass being vibrated which is mounted on a support. A crank is provided on the shaft and said rod is articulated with one of its ends to said crank and with the other end, to the mass being vibrated, whereas the housing is articulated to the support of the mass being vibrated and, the axis of the shaft is parallel to the axis of the articulated joint.

Such a constructional arrangement of the vibrator contributes to stabilized oscillating conditions of the mass being vibrated.

These and other objects are also accomplished by a mechanical system for converting rotary motion into reciprocating motion, incorporating a vibrator and a drive kinematically associated with said vibrator and comprising an electric motor whose shaft carries a pulley, whereas another pulley is set on the vibrator shaft. The drive pulley set on the vibrator shaft is offset with respect to the axis of said shaft in a direction diametrally opposite to that of the crank a distance approximately equal to the amount of amplitude of the vibrator shaft axis oscillation.

Such a constructional arrangement of a mechanical system for converting rotary motion into reciprocating motion adds to the operational reliability of said system.

BRIEF DESCRIPTION OF THE DRAWINGS

In what follows, the present invention is illustrated in a specific exemplary embodiment thereof to be read with reference to the accompanying drawings, wherein.

DESCRIPTION OF THE PREFERRED EMBODIMENTS

Figure 1:
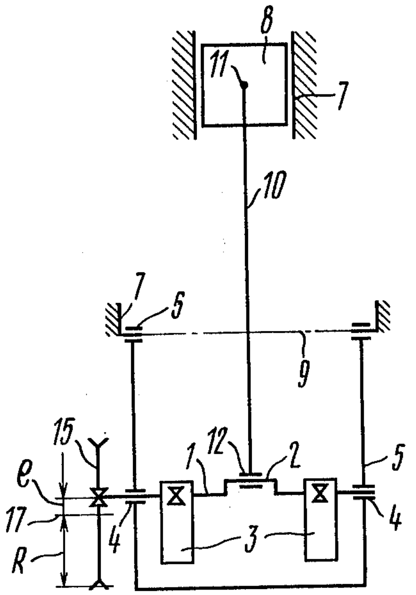
FIG. 1 is a kinematic diagram of a directional-action mechanical vibrator.

The directional-action mechanical vibrator of the present invention comprises a shaft 1 (FIG. 1) linked to a drive and provided with a crank 2 and inertia masses 3 eccentrically arranged thereon. The inertia masses 3 are so held to the shaft 1 that their centers of inertia are arranged diametrally opposite to the axis of the crank 2 with respect to the axis of the shaft 1. The shaft 1 is accommodated in a housing 5 and rests upon bearings 4. The housing 5 is linked to a support 7 of a mass 8 being vibrated through a hinge joint 6 in such a manner that the axis of the shaft 1 is parallel to an axis 9 of the hinge joint 6. The crank 2 of the shaft 1 is linked to the mass 8 being vibrated through a rod 10 and hinge joints 11 and 12.

Figure 2:
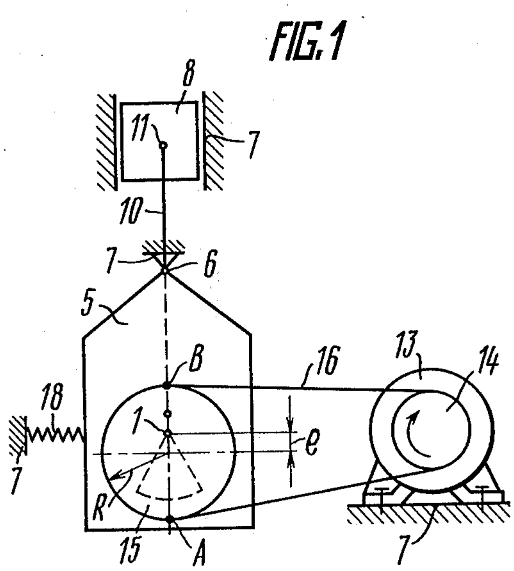
FIG. 2 is a diagrammatic view of a mechanical system for converting rotary motion into reciprocating motion.

The mechanical system for converting rotary motion into reciprocating motion (FIG. 2) incorporates said directional-action mechanical vibrator and a drive linked to said vibrator comprises an electric motor 13 with a pulley 14 on the motor shaft, a pulley 15 set on the vibrator shaft 1, and a drive belt 16. An axis 17 of the pulley 15 set on the vibrator shaft 1 is offset with respect to the shaft 1 in a direction diametrally opposite to the crank 2 a distance "e" approximately equal to the amplitude of oscillation of the axis of the shaft 1. The axis of the shaft 1 and that of the shaft of the motor 13 are nearly coplanar, their plane being normal to the direction of reciprocating motion performed by the mass 8 being vibrated. The vibrator housing 5 is associated with the support 7 through a spring 18 which provides for tension of the belt 16.

The directional-action mechanical vibrator (FIG. 1) of the present invention operates as follows.

The shaft 1 carrying the crank 2 and the inertia masses 3 receives rotation from the drive linked thereto. The rod 10 performs plane-parallel motion and imparts a directional reciprocating motion to the mass 8 being vibrated. The force of inertia of the mass 8 being vibrated is balanced by a component of the centrifugal force developed by the inertia masses 3, while the other component of that force is translated to the housing 5. Forasmuch as the housing 5 is linked to the support 7 through the hinge joint 6, it performs swinging (or pendulum) motion about the axis 9 of the hinge joint 6. Balancing of the component of the centrifugal force produced by the inertia masses 3 and setting the housing 5 in swinging motion is attained due to the fact that the center of inertia of the housing 5 is located on the axis of the shaft 1.

In order to attain a more complete mutual balancing of the gyrating masses 3 and the mass 8 being vibrated, the inertia masses 3 shall be of the same magnitude and be arranged on the shaft 1 symmetrically to the crank 2.

When the magnitude of the mass 8 being vibrated changes, the amplitude of its oscillation varies but negligibly, being nearly equal to the throw of the crank 2.

The provision of the directional-action mechanical vibrator of the invention, and due to arranging the crank 2 on the shaft 1 and connecting said crank 2, through the rod 10 and the hinge joints 11 and 12, to the mass 8 being vibrated contributes to imparting stable-amplitude directional oscillations to said mass 8.

A change in the magnitude of the mass 8 being vibrated causes no substantial change in the amount of the vibration amplitude of said mass.

Linking of the housing 5 to the support 7 through the hinge joint 6 in such a way that the axis of the shaft 1 and the axis 9 of the hinge joint 6 should be parallel to each other, as well as provision of the equal-in-magnitude inertia masses 3 arranged on the shaft 1 symmetrically with respect to the crank 2 ensure a fairly complete and reliable balancing of the forces of inertia.

The mechanical system for converting rotary motion into reciprocating motion by virtue of said mechanical vibrator, operates as follows.

Rotation from the pulley 14 (FIG. 2) of the motor 13 is transmitted, via the drive belt 16, to the pulley 15 set on the shaft 1 of the vibrator, the tension of the drive belt 16 being provided by the spring 18. When the shaft 1 rotates its axis travels, along with the housing 5, according to the law of harmonic oscillation under the effect of a component of the force of rotary inertia of the inertia masses 3. As a result the points of the estimated circle of the pulley 15 having a radius R, perform a compound motion, viz., a relative motion-rotation round the axis of the shaft 1, and a translational motion-oscillation along with the axis of said shaft.

As a result of the above motion an absolute velocity of, say, the point A is equal to $$V_A=(R+e)\omega-a\omega$$

where "a" stands for the amount of oscillation amplitude of the shaft 1 axis;

"ω" denotes an angular frequency of revolution of the shaft 1.

An absolute velocity of another point, say, "B" is accordingly as follows $$V_B=(R-e)\omega+a\ \omega.$$

If, according to the invention, an equality e=a holds true, the absolute velocities of the points A and B equal the product of R·ω. Then, the absolute velocities of the other points of the estimated circle of the pulley 15 equal to the product R·ω are determined in a similar way. This, in turn, provides for nearly invariable magnitude of the angular velocity of the shaft 1 and of the speed of the belt 16 which increases its durability several times. At the same time a reliable operation of the entire mechanical system for converting rotary motion into reciprocating motion is ensured.

Application of the directional-action mechanical vibrator and the mechanical system for converting rotary motion into reciprocating motion provided, for example, in separating machinery, jigging conveyers, etc. adds much to the operating efficiency of such machines and their reliability due to stabilized oscillation amplitude of the machine elements being vibrated and a more dependable operation of the mechanical system for converting rotary motion into reciprocating motion.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims

What is claimed is:

1. A directional-action mechanical vibrator comprising a housing linked, through a hinge joint, to the support of the mass being vibrated so as to balance the forces of inertia developed by said vibrator; a shaft mounted inside said housing parallel to said axis of said hinge joint; a crank provided on said shaft so as to stabilize the oscillation amplitude of said mass being vibrated; a number of inertia masses arranged on said shaft on both sides of said crank so that the centers of inertia of said masses are arranged diametrally opposite to said crank with respect to the axis of said shaft, thereby providing the balancing of the force of inertia developed by said mass being vibrated; a rod having two ends of which one end is articulated to said crank, and the other end to said mass being vibrated; the center of mass of said housing is arranged near the axis of said shaft; and the axis of said hinge joint is located close to said rod and forms an angle therewith approximately equal to $\pi/2$ radian.

2. A mechanical system for conveying rotary motion into reciprocating motion, comprising a directional-action mechanical vibrator which has a housing linked, through a hinge joint, to the support of the mass being vibrated so as to balance the forces of inertia developed by said vibrator; a shaft mounted inside said housing parallel to the axis of said hinge joint; a crank provided on said shaft so as to stabilize the oscillation amplitude of said mass being vibrated; a number of inertia masses arranged on said shaft on both sides of said crank so that the centers of inertia of said masses are arranged diametrally opposite to said crank with respect to the axis of said shaft, thereby providing the balancing of the force of inertia developed by said mass being vibrated; a rod having two ends of which one end is articulated to said crank, and the other end to said mass being vibrated; a pulley set on said shaft, the axis of said pulley being offset with respect to the axis of said shaft in a direction diametrally opposite to said crank a distance approximately equal to the oscillation amplitude of said shaft, so as to achieve a constant rotating speed of said pulley; a drive comprising an electric motor with a shaft; a pulley set on said shaft of said electric motor; and a drive belt interlinking said pulley of said electric motor and said pulley of said vibrator.

* * * * *